United States Patent [19]

Höll et al.

[11] 4,299,922
[45] Nov. 10, 1981

[54] METHOD FOR REGENERATING ANION EXCHANGE RESINS IN BICARBONATE FORM

[75] Inventors: Wolfgang Höll, Ettlingen; Karl-Ekkehard Sester, Oberkirch; Siegfried H. Eberle, Eggenstein; Heinrich Sontheimer, Karlsruhe, all of Fed. Rep. of Germany

[73] Assignee: Kernforschungszentrum Karlsruhe, Gmbh, Karlsruhe, Fed. Rep. of Germany

[21] Appl. No.: 97,309

[22] Filed: Nov. 26, 1979

[30] Foreign Application Priority Data

Nov. 25, 1978 [DE] Fed. Rep. of Germany ....... 2851135
Sep. 13, 1979 [DE] Fed. Rep. of Germany ....... 2937022

[51] Int. Cl.³ ............................................. B01J 49/00
[52] U.S. Cl. ..................................... 521/26; 210/673
[58] Field of Search .................... 521/26; 210/32, 673

[56] References Cited

U.S. PATENT DOCUMENTS

| 3,429,835 | 2/1969 | Odlond | 521/26 |
| 3,691,109 | 9/1972 | Larsen | 521/26 |
| 4,172,185 | 10/1979 | Patherom | 521/26 |
| 4,202,737 | 5/1980 | Shimizu | 521/26 |
| 4,230,807 | 10/1980 | Evans | 521/26 |

FOREIGN PATENT DOCUMENTS

| 2530677 | 1/1977 | Fed. Rep. of Germany | 521/26 |
| 2714297 | 10/1978 | Fed. Rep. of Germany | 521/26 |

OTHER PUBLICATIONS

"Desalination ... Exchange"—A. C. Epstein, M. B. Yeligar, Ion Exchange and Membranes, 1973, vol. 1, pp. 159–170.

Primary Examiner—William F. Hamrock
Assistant Examiner—Peter F. Kulkosky
Attorney, Agent, or Firm—Spencer & Kaye

[57] ABSTRACT

Charged anion exchange resins, which are used for the removal of strong acid ions from water, are regenerated to their bicarbonate form by contacting them with an aqueous treating medium containing calcium carbonate and carbon dioxide.

8 Claims, 6 Drawing Figures

METHOD FOR REGENERATING ANION EXCHANGE RESINS IN BICARBONATE FORM

BACKGROUND OF THE INVENTION

The present invention relates to a method for regenerating anion exchange resins in bicarbonate form which are present in aqueous suspensions and are used for the removal of strong acid anions from untreated waters. In the process, a calcium compound in solid form and gaseous $CO_2$ are employed simultaneously and the ion exchange resin is separated from the effluent (regenerate) after the regeneration process and reused.

In the prior art, anion exchange resins have been regenerated generally with alkali solutions, such as, for example, sodium hydroxide, sodium carbonate, or ammonium hydroxide solutions. In order to overcome the drawbacks of these processes during regeneration of weak base anion exchange resins, it has been proposed in German Offenlegungsschrift No. 2,530,677 to use a 1 to 5 weight percent calcium hydroxide suspension as the regeneration agent. The regeneration agent here is conducted from the bottom to the top through a granular ion exchange mass, is then expelled, and the ion exchange resin is then rinsed with water. The weak base anion exchange resin is thereby returned to its hydroxyl form and can be reused.

During the removal of strong acid anions, such as chloride, sulfate or nitrate ions, from untreated waters, it has been found that anion exchange resins in bicarbonate form give good results. For full desalination processes, such anion exchange resins in bircarbonate form are used in combination with cation exchange resins. U.S. Pat. No. 3,691,109 discloses such a process for regenerating the resins in a desalination system in which the combination of a weak acid cation exchange resin with a weak base anion exchange resin employed during the desalination of water is regenerated in a three-bed system when the ion exchange masses become exhausted.

In the process disclosed in U.S. Pat. No. 3,691,109, gaseous carbon dioxide is introduced into the cation exchange bed at a pressure of 0.35 MPa to 6.89 MPa (1 MPa=10 bar) in order to regenerate the weak acid cation exchange resin or to return its sodium form to the free acid form, respectively. The resulting effluent from this step, which contains sodium bicarbonate and free carbonic acid, is degassed, i.e. the carbon dioxide is removed, and the solution obtained in this way is used to regenerate the weakly basic anion exchange resin. The regenerated ion exchange resins are then charged in a countercurrent direction with the water to be desalted. Thus, after regeneration, the anions are first removed from the untreated water in bed 3 which contains the weak base anion exchange resin. Then, in bed 2, calcium and magnesium ions are precipitated as $Mg(OH)_2$ and $CaCO_3$ with the aid of an added calcium hydroxide suspension and only thereafter, in bed 1, are monovalent cations eliminated by the weak acid cation exchange resin. When the ion exchange resins are exhausted, the cycle begins anew with the regeneration step.

It is disclosed in U.S. Pat. No. 3,691,109 that water which is saturated with carbon dioxide at a carbon dioxide pressure of 0.5 to 1.0 MPa has a pH of about 3.3, at which pH the weak acid cation exchange resin has a negligible capacity for monovalent and bivalent ions. Particularly preferred, however, are carbon dioxide pressures between 0.7 and 2.0 MPa because under these conditions the process is claimed to operate most efficiently.

The process disclosed in U.S. Pat. No. 3,691,109 is directed toward a full desalination—regeneration of the ion exchange masses employed there, and particularly is concerned with the regeneration of a combination of weak acid cation exchange resins and weak base anion exchange resins. The process thus cannot be used universally. Further, the process can be performed only in a relatively complicated system and requires costly chemicals for the removal of the calcium and magnesium ions, in particular, $Ca(OH)_2$ or $CaO$.

An article entitled *Desalination of Brackish Water by Ion Exchange,* by A. C. Epstein and M. B. Yeligar, appearing in "Ion Exchange and Membranes", Vol I, pp 159–170 (1973), provides a review of four ion exchange systems for the desalination of water. In the so-called Desal Process, which employs a three-bed system, a weak base anion exchange resin in bicarbonate form is used in the first column, a weak acid cation exchange resin in the free acid form is used in the second column and a weak acid anion exchange resin in the hydroxyl form is used in the third colum. The regeneration of the first column is effected with the aid of an amonium hydroxide solution and softened raw water from the discharge of the second column so as to convert the weak base anion exchange resin into the hydroxyl form. The weak acid cation exchange resin in the second column is regenerated with diluted sulfuric acid and the weak base anion exchange resin in the third column is converted by the introduction of carbon dioxide, to a major portion in the bicarbonate form and to a minor portion in the hydroxyl form. Thereafter, the three columns are again ready for the next desalination process which, then, however, takes place in the opposite direction, i.e. the raw water is now charged into the third column.

According to Epstein et al, the three bed Desal process is not very effective and yields the poorest quality desalted water of the four processes described. There is also a possibility of calcium carbonate precipitation in the first colum. This, Epstein et al state, cannot be tolerated because it allegedly reduces the anion exchange resin capacity, consumes carbon dioxide, increases the costs for pumping and interferes with the flow conditions in the resin bed.

A second Desal process described by Epstein et. al operates with a two-bed system. In this process, the third column of the three-bed Desal system is replaced by a decarbonator. The process is similar to the three bed process, with the exception that the effluent from the second column, which column contains the weak acid cation exchange resin, is conducted through the decarbonator in order to remove the carbon dioxide. The regeneration of the weak base and weak acid ion exchange resins is also similar to that described in connection with the three-bed process. However, after the weak base anion exchange resin has been regenerated to the free base form with an ammonium hydroxide solution and softened raw water, it must be converted to the bicarbonate form by means of a treatment with carbon dioxide. The longer time required for this conversion makes it necessary to use a larger quantity of resin and longer columns. Further, the two bed Desal process, as well as the three bed process, employs an ammonium hydroxide solution as a regenerating agent, and this is entirely unsuitable for some applications, particularly for the preparation of drinking water.

Epstein et al also disclose the so-called SUL-biSUL process which is performed in a two-bed system comprising a column with a strong acid resin in hydrogen form and a subsequent column with a strong base resin in sulfate form. After the raw water has been desalted, the cation exchange resin is loaded with cations, and the anion exchange resin is present in the chloride or bisulate form. The effluent from the anion exchange column in this process is freed of carbon dioxide in a decarbonator.

For regeneration, the cation exchange resin is treated with diluted sulfuric acid, and the anion exchange resin present in the chloride or bisulfate form, respectively, is treated with raw water so that the sulfate/bisulfate equilibrium is reversed until the resin has been returned to the sulfate form.

The main drawback of the SUL-biSUL process is the limitation of its use to waters which have a sulfate to chloride ratio of 9:1 or greater. Moreover, the capacities of both resins used in this process are relatively low, which necessitates the use of either long columns or frequent regenerations, which has an adverse effect. Also, the regeneration with raw water produces large amounts of waste water which contain sulfuric acid and must therefore be neutralized.

Finally, Epstein et al discuss the RDI process. This process is performed in a four-bed system comprising a first column with a strong base resin in bicarbonate form, a second column with a weak acid exchange resin in hydrogen form, a third column with a strong acid resin in hydrogen form and a fourth column with a weak base resin in free base form and, connected to the fourth column, a decarbonator. During the desalination, the first column is charged with chloride and sulfate ions and the second column retains the cations. The discharge from the second column contains carbonic acid which passes through the third and fourth columns and is removed in the decarbonator. Neutral salts which have passed through the first and second columns are hydrolyzed in the third column and the resulting mineral acid is absorbed in the fourth column by the free base form of the weak base resin. For regeneration, sulfuric acid is flowed from the bottom to the top through the strong acid cation exchange column, and the resulting effluent is charged into the top of column two (the weak acid column) to regenerate the weak acid cation exchange resin. The charged strong base anion exchange resin is treated with sodium bicarbonate solution and the resulting effluent is used to regenerate the weak base anion exchange resin in column four by flowing the effluent from the bottom to the top through column four. The major drawback of this process lies in the high costs for the sodium bicarbonate.

In the above-mentioned full desalination processes which provide a combination of cation and anion exchange resins, the regeneration effect, when carbon dioxide is used for the regeneration, is poor and the ion exchange takes place very slowly.

SUMMARY OF THE INVENTION

It is an object of the present invention to provide a process for regenerating anion exchange resins which are used to remove the anions of strong acids from raw waters.

It is also an object of the present invention to convert an anion exchange resin which has been charged with, for example, chloride, nitrate or sulfate ions to the maximum possible degree back to the bicarbonate form.

It is another object of the present invention to provide a regeneration process which overcomes the drawbacks of the prior art.

It is another object of the present invention to avoid conversion of the anion exchange resin to free base form during the regeneration process.

It is still another object of the present invention to provide a regeneration process which maximizes recovery of the exchange resin with the simplest operation.

It is a further object of the present invention to provide a regeneration process wherein the mode of operation minimizes investment and operating expenditures.

To achieve these objects, and in accordance with its purpose, the present invention provides a process for regenerating, to bicarbonate form, a charged anion exchange resin which is used for the removal of strong acid anions from water, and which after regeneration is separated from an effluent formed during the regeneration and reused, the regeneration being conducted by contacting the charged resin with an aqueous treating medium which forms an aqueous suspension with the resin, comprising: providing in the aqueous suspension a quantity of calcium carbonate in excess of that which is necessary to maintain solid calcium carbonate in the resin suspension during the entire period of the regeneration, with the pH of the resin suspension during regeneration being at about 5 to 7; and simultaneously introducing gaseous carbon dioxide into the aqueous suspension, with the partial pressure of the carbon dioxide above the resin suspension being maintained at between about $5 \times 10^{-3}$ MPa and about 1.0 MPa during the period of the regeneration, wherein the concentration of bicarbonate ion in the resin suspension is kept constant during the entire period of the regeneration.

In a advantageous embodiment of the method according to the invention the $CO_2$ partial pressure above the suspension is between 0.01 MPa and 0.2 MPa.

The calcium carbonate is advantageously added in powder form to the aqueous suspension of charged ion exchange resin through which a $CO_2$-containing gas flows. After regeneration process, the calcium carbonate is separated from the regenerated ion exchange resin, by rinsing, and may be reused. A further reduction in cost is realized if the calcium carbonate used is of a type that is produced by a weak acid cation exchange resin during a known regeneration process. (German Offenlegungsschrift No. 27 14 297).

In a further advantageous embodiment of the present invention, the regeneration process is repeated several times in a series on the same charge of ion exchange resin, that is, a charged resin is subjected to a number of regeneration treatments before it is reused. Advantageously, fresh raw water need be used only for the last stage of the regeneration series. The other stages in the series are treated with the less concentrated effluent solutions from a previous regeneration series. The penultimate regeneration is performed with the effluent water having the lowest anion concentration, such as the final effluent form the previous regeneration series. The stage before the penultimate is performed with the effluent having the next highest anion charge, and so on. The first stage regeneration is performed with the anion containing effluent from a previous regeneration series, which effluent has the greatest anion concentration for the series being performed, but which is the effluent, for example, having the next to greatest anion concentration from the previous regeneration series. Thus, each successive regeneration in the series is performed with water having a lesser anion concentration than the previous regeneration series.

It has further been found that the efficiency of the regeneration process may be improved by treating the exchange resin, prior to the $CaCO_3/CO_2$ treatment, with a solution of $CaCl_2$ having a $Cl^-$ concentration of about 0.5 to about 1.0 mole/liter.

It is to be understood that both the foregoing general description and the following detailed description are exemplary, but are not restrictive of the invention.

BRIEF DESCRIPTION OF THE DRAWINGS

The accompanying drawings, in which like numbers indicate like parts, illustrate examples of presently preferred embodiments of the invention and, together with the description, serve to explain the principles of the invention.

Of the drawings.

DETAILED DESCRIPTION OF THE INVENTION

In contrast to prior art processes which avoided, when possible, the use of solids during the regeneration of anion exchange resins, the process according to the present invention utilizes solid calcium carbonate. The presence of carbon dioxide with the $CaCO_3$ enables the present invention to use the equilibrium:

$$R^+Cl^- + H_2O + CO_2 + CaCO_3 (s) \rightleftharpoons R^+HCO_3^- + \tfrac{1}{2} CaCl_2 + \tfrac{1}{2} Ca(HCO_3)_2$$

The introduction of $CO_2$ into the suspension of charged anion exchange resin ($R^+Cl^-$) produces a shift of this equilibrium to the right, thus regenerating the resin in bicarbonate form ($R^+HCO_3^-$). The partial pressure of $CO_2$ above the resin suspension should be maintained at about $5 \times 10^{-3}$ MPa to about 1.0 MPa and preferably about 0.01 MPa to about 2.0 MPa throughout the regeneration process.

Figure 1:
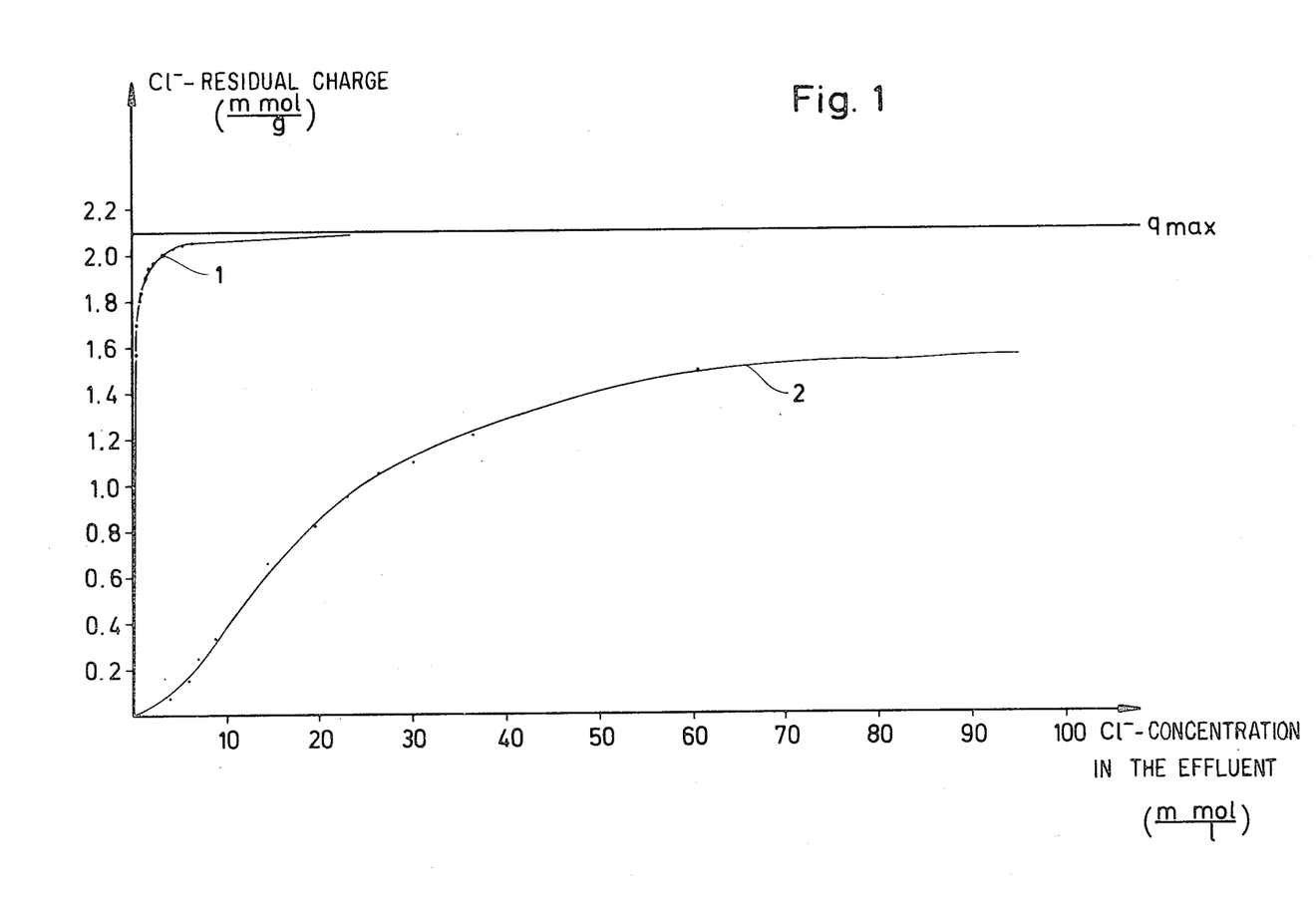
FIG. 1 shows the results of two experimental resin regenerations.

This regeneration process will not occur in the absence of $CO_2$ by adding only $CaCO_3$. The exclusive use of $CO_2$, on the other hand, dissolved in water, lowers the pH to such an extent that the $HCO_3^-$ concentration in water becomes extremely small. The curve 1 in FIG. 1 shows that the regenerating effect then becomes minimal.

The use of higher concentration $HCO_3^-$ solutions, such as a $NaHCO_3$ solution, has the drawback that, due to the hydrolytic splitting of the salt solutions, some of the strong base exchangers (pH=9) are converted to the undesirable free base form. In particular, the weak base exchange resins which are preferred for their capacity and chemical stability, are predominantly converted thereby to the $OH^-$ form so that they are unable to split neutral salts.

In contrast, the combined use of an aqueous solution containing dissolved $CO_2$ and solid calcium carbonate as proposed by the present invention, avoids the above-mentioned drawbacks and combines the advantages of the above-described methods. Depending on the selection of the $CO_2$ partial pressure, the pH should remain between 5.0 and 7.0, a range at which there does not exist an excess of $OH^-$ ions. It has been found that this results in surprisingly good regenerating efficiency. Curve 2 of FIG. 1 indicates that up to high chloride concentrations in the effluent solution, a recovery capacity of 30 to 50% can be obtained. This good efficiency is the result of the fact that $HCO_3^-$ ions consumed by the regeneration are continuously replenished by the dissolution of corresponding quantities of solid $CaCO_3$.

Thus, during the regeneration process, one equivalent $HCO_3^-$ is produced from the $CaCO_3$ per equivalent $Cl^-$, so that almost no drop in concentration of $HCO_3^-$ ions occurs.

Therefore, the amount of solid $CaCO_3$ added to the resin suspension, will be in excess of the amount required to maintain solid $CaCO_3$ in the resin suspension during the entire period of regeneration with the pH of the resin suspension being at about 5 to about 7 during the regeneration. This amount is dependent on the dissolving rate of the $CaCO_3$ and the duration of the regeneration. The dissolving rate depends on the partial pressure of $CO_2$ and the temperature. The range of typical amounts of $CaCO_3$ lies between 5 g and 30 g per liter exchange resin. The regeneration time varies from 10 to 40 minutes.

The presence of solid calcium carbonate enables the regeneration process to take place with a constant $HCO_3^-$ concentration, independent of the $Cl^-$, $NO_3^-$ and $SO_4^{--}$ concentrations. One half quantity of bicarbonate ions is supplied by the $CaCO_3$, which is the least expensive regenerating chemical the other half by the $CO_2$.

The calcium salts formed during the regeneration of exchange resins charged with chloride or nitrate ions are easily soluble in water, so that high concentrations can be realized in the effluent of the regeneration. The $CaSO_4$ formed during the regeneration of sulfate charged resins, however, is only slightly soluble (solubility of 0.199%). This poor solubility can be used to advantage during the regeneration process. Because $CaSO_4$ is precipitated in solid form when its solubility product in the effluent is achieved, the sulfate of the exchange resin is converted to solid gypsum which is removed either with the effluent or with rinsing water and following filtration almost directly. This precipitated quantity of $CaSO_4$ does not influence the regeneration equilibrium. Consequently, the regeneration is independent of the volume ratio of exchange (because the $SO_4^{--}$ concentration remains constant in the presence of solid $CaSO_4$) resin to water, so that the regeneration process requires little water.

Another advantage of the present invention is that there is no need to use processed water for the regeneration process since the attainable effluent concentration almost always lies considerably above the raw water concentration and in multistage regeneration processes the effluent can be further concentrated.

The recovery capacity for regenerated resin becomes greater as the $HCO_3^-$ concentration of the regeneration solution increases. Due to the physical solubility of $CO_2$ and due to the dissociation equilibrium of carbonic acid, this $HCO_3^-$ concentration increases with increasing partial pressure and increasing pH. However, these two dependencies counteract each other. With increasing pressure, the solution becomes more acid so that the pH drops and the proportion of $HCO_3^-$ in the total amount of carbonic acid also drops. The result is that the equilibrium position does not depend significantly on the partial pressure of the $CO_2$. The optimum range for the $CO_2$ partial pressure lies between about 0.01 to 0.2 MPa. Thus, pressure apparatus, which is expensive for such a system, can be eliminated. Since the regeneration rate is determined mainly by the dissolution of solid $CaCO_3$, it is sufficient for the process to maintain the partial pressure of the $CO_2$. Thus, the $CO_2$ or the $CO_2$-containing gas can be recycled through the reactor and only the spent amount of $CO_2$ has to be injected.

Only such salts which had already been contained in the raw water reach the receiving stream or effluent canal (plus the nonpolluting lime, if the unspent $CaCO_3$ is not returned to circulation or is eliminated by filtration) plus a smaller quantity of sulfate than had been contained in the raw water since part of it will be in solid, manageable form.

The anion exchange resins suitable for use with the present process include those commonly used for water desalination. For example, the anion exchange resins described in the above referred article by Epstein et al and above referred to U.S. Pat. No. 3,691,109 can be used in practicing the present invention.

Calcium carbonate is generally added in powder form to the charged resin, and carbonate which is not consumed in the process may be separated from the resin by rinsing and reused. It is especially advantageous if the particular type of calcium carbonate used results during a known regeneration process of a weak acid cation exchange resin.

It has been found that, depending on the selectivity of the exchange resin used, the resin is enriched with sulfate ions and to a lesser degree with nitrate and chloride ions during charging of the resin and releases bicarbonate ions. The efficiency of the $CaCO_3/CO_2$ regeneration by comparison is somewhat better with a nitrate-charged resin rather than a sulfate-charged resin and is best with a chloride-charged resin. In view of these findings, it has been discovered that the efficiency of the $CaCO_3/CO_2$ regeneration can be improved. In order to improve the efficiency of the regeneration process, the exchange resin may be treated, prior to the $CaCO_3/CO_2$ treatment, with a solution of calcium chloride, having a $Cl^-$ concentration of of about 0.5 to about 1.0 moles/l. This treatment converts the resin to the chloride form, and the $CaCO_3/CO_2$ process then is performed on the resin in the chloride form.

Thus, $CaCl_2$ treatment of the resin prior to the $CaCO_3/CO_2$ resin treatment, will optimize the efficiency of the regeneration process. The residual salt concentrations otherwise reaching the receiving stream together with the effluent are reduced considerably since the sulfate ions are already precipitated from the resin in the chloride effluent as $CaSO_4$, and can be separated. An anion exchange resin regenerated in this way removes all sulfate and practically all nitrate from a raw water to be purified. During charging of the resin sulfate and nitrate ions are replaced by chloride and by bicarbonate ions. The ratio of said chloride to said bicarbonate ion species, depending on the type of raw water involved, lies between 1:1 and 3:1. This further lowers the neutral salt content, and the annoying residual nitrate and sulfate ions are simultaneously removed almost completely.

The process according to the present invention thus constitutes a process which can be practiced with very few and very inexpensive chemicals and which does not produce an unnecessary strain on the environment.

Referring now to the drawings, FIGS. 1 shows the results of two regeneration experiments with an anion exchange resin which had the same chloride charge each time. In one case, represented by curve 1, the resin was treated exclusively with $CO_2$ gas under a pressure of 0.1 MPa and, in the other case, represented by curve 2, with a $CaCO_3$ precipitate and $CO_2$ gas under a pressure of 0.1 MPa. While curve 1 clearly shows the inefficiency of $CO_2$ alone, curve 2 shows an about 30% recovery capacity with a single regeneration stage. The curves 1 and 2 consist of points which indicate the state of equilibrium between residual resin charges and effluent concentrations.

Figure 2:
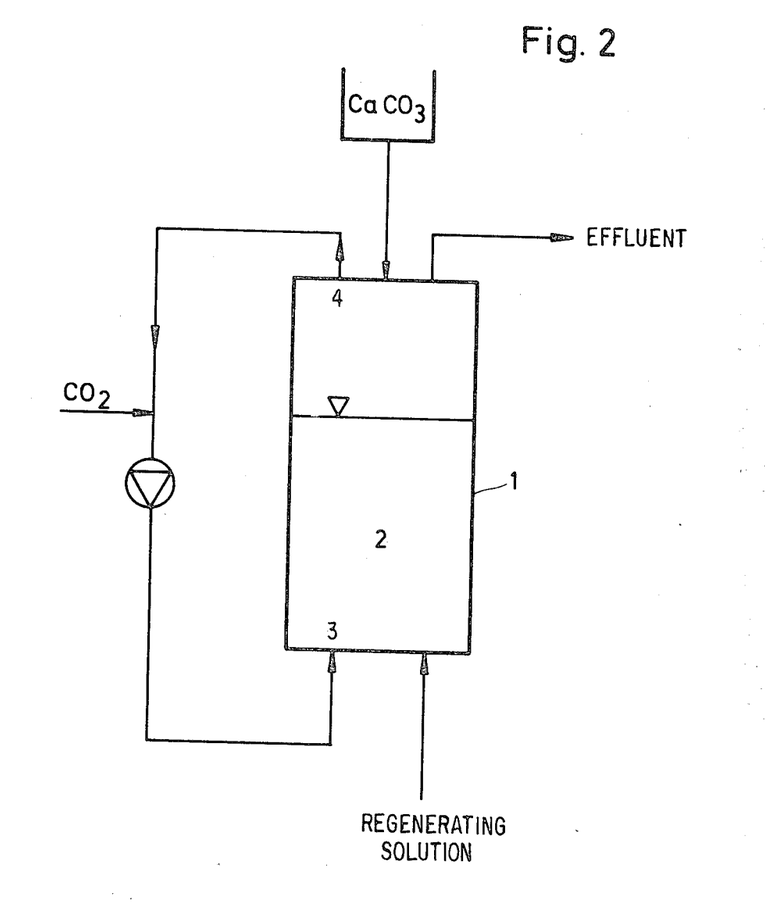
FIG. 2 is a schematic illustration of one stage of an apparatus used for resin regeneration in accordance with one embodiment of the present invention.

An apparatus used for one stage of a regeneration system is schematically illustrated in FIG. 2. The apparatus comprises a suspension reactor 1 in which discontinuous or batchwise regeneration can be performed. Anion exchanger, $CaCO_3$ and regenerating solution are introduced into reactor 1 in charges. The $CO_2$ or the $CO_2$-containing gas is blown into reactor 1 through a porous plate or a nozzle bottom 3 (four-phases system 2: the phases are $CO_2$-gas, water, $CaCO_3$, and exchange resin), is extracted at the head 4 of reactor 1 and returned to circulation. The turbulence produced in the anion exchange material by the blowing process results in intensive mixing of the suspension and simultaneously prevents sticking together of the resin grains due to the precipitation of $CaSO_4$.

Figure 3:
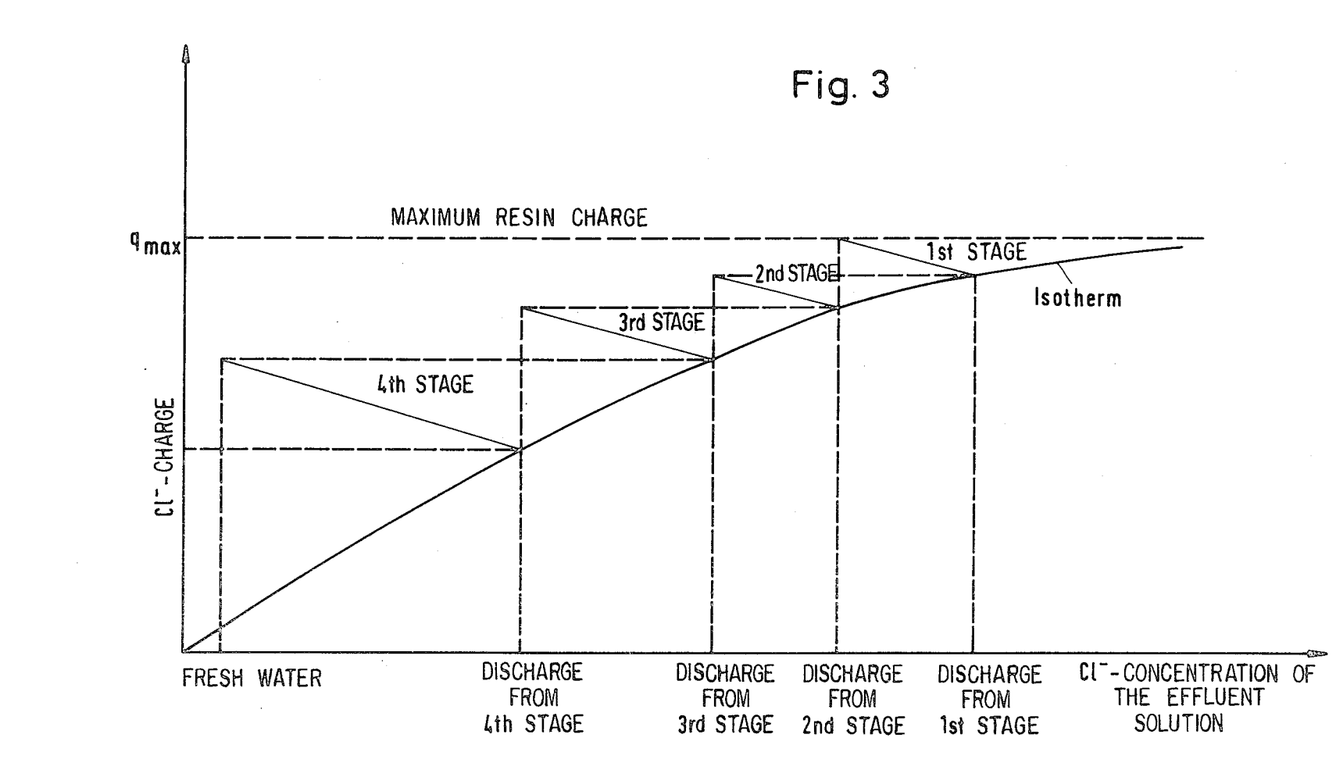
FIG. 3 is a schematic illustration of a series of regenerations using the effluent from a previous series of regenerations in accordance with another embodiment of the present invention.

The apparatus of FIG. 2 is particularly suitable for multistage regeneration which becomes necessary when the ion exchanger is charged with $Cl^-$ or $NO_3^-$ ions. It is then appropriate not to discard the less concentrated effluent solutions from the second, third, etc. stages since they can be reused and further concentrated. The regeneration then begins in the first stage with the discharge of the second stage of the previous regeneration process, the second stage regeneration begins with the discharge of the third stage of the previous regeneration process, etc. and only in the last stage is fresh water required. Thus a multistage regeneration process requires only a small partial quantity of fresh water for the regeneration. FIG. 3 shows the sequence of such a regeneration in schematic form.

Figure 4:
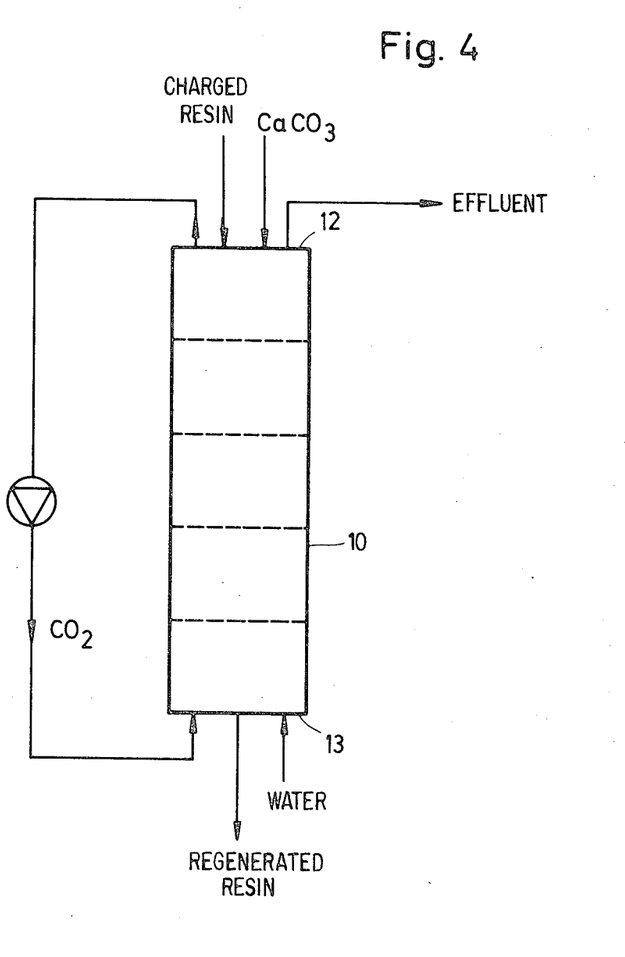
FIG. 4 is a schematic illustration of an apparatus used for continuous regeneration in countercurrent in accordance with a further embodiment of the present invention.

An apparatus for continuous regeneration in countercurrent is schematically illustrated in FIG. 4. A countercurrent regeneration which is continuous with respect to the exchange resin and water can be performed in a perforated bottom column 10 which is charged from the top with the charged exchange resin and pow- TABLE 2-continued

| Anion Exchange | Ratio of quantities of simulated raw water to anion exchange resin (liters of water per ml of resin) | Initial concentration of ions in water (mmol/l) | Decrease in concentration in the water after the sorption process |
|---|---|---|---|
| | 0.4 liter/ml | 5 | 28.6% |

EXAMPLE 3

(a) Elimination of chloride, nitrate and sulfate ions without conversion of the exchange resin into the chloride form before regeneration with $CO_2$ and $CaCO_3$.

500 ml of a strong base anion exchange resin with quaternary amino groups (Type I) were used. First, the exchange resin was charged for 40 hours, until an equilibrium charge had been obtained. A raw water of the following composition
$cCl = 2.75$ mmol/l
$cNO_3 = 1.50$ mmol/l
$cSO_4 = 1.20$ mmol/l
and flow of 2.4 l/h were used.

In a first regeneration, the charged ion exchange resin was mixed in a vessel containing 4.81 l of the same raw water used for charging and 20 g $CaCO_3$, while $CO_2$ (partial pressure 0.1 MPa) was being introduced for a period of 4 hours and at a throughput of 200 to 300 l (with recycling of the $CO_2$ this requires only 10 l). The concentration of the ions to be removed from the exchange resin in the decanted effluent after a treatment of four hours was:
$cCl = 5.08$ mmol/l
$cNO_3 = 2.69$ mmol/l
$cSO_4 = 9.09$ mmol/l
Thus, there were removed a total of
11.19 mmol chloride ions,
5.75 mmol nitrate ions and
37.94 mmol sulfate ions.

The ion exchange resin pretreated in this way was now used in an experiment to determine its elimination (ion exchange) capability for two elimination stages with a regeneration between the eliminations.

Figure 5:
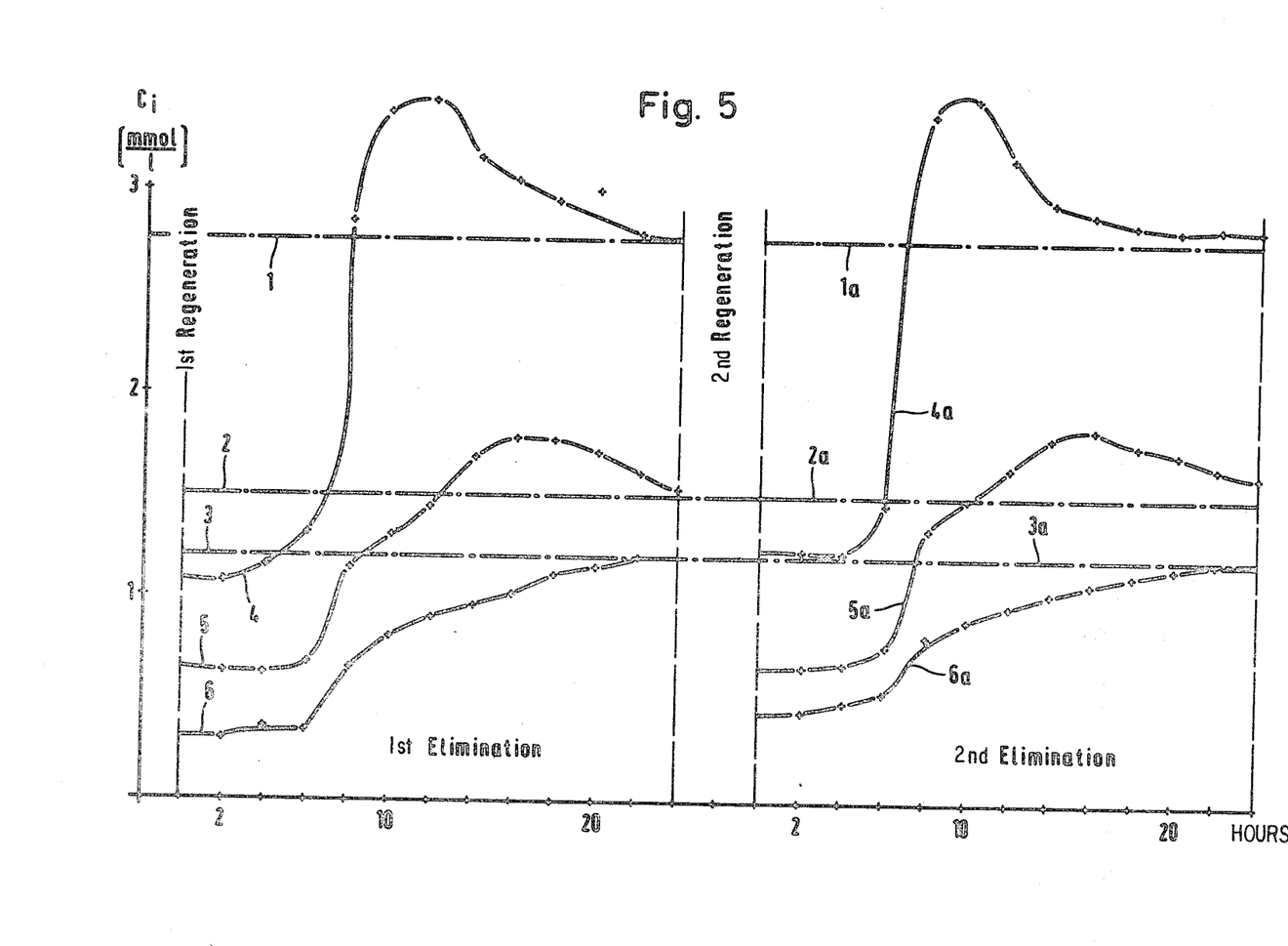
FIG. 5 shows the intake and discharge concentrations of chloride, nitrate and sulfate ions during two purifications performed in a sequence of regeneration-purification-regeneration-purification.

FIG. 5 shows the concentration curves for the chloride, nitrate and sulfate ions for the duration of this experiment which consisted of two 24 hour eliminations of the above-mentioned ions from the raw water and a four-hour regeneration of the exchanger. The raw water throughput was again 2.4 l/h. During the first 10 hours of the first elimination (in the range of true elimination without displacement effects) there were removed from the water:
24.96 mmol chloride ions
17.04 mmol $NO_3$ ions and
17.88 mmol $SO_4$ ions.

The average concentrations in the discharged water after the ion exchanger for this period of time were:
$cCl = 1.71$ mmol/l
$cNO_3 = 0.79$ mmol/l
$cSO_4 = 0.46$ mmol/l.

In FIG. 5, curve 1 shows the intake of chloride ions, curve 2 shows the intake of nitrate ions and curve 3 the intake of sulfate ions during the first elimination process. The corresponding discharge concentrations are represented by curves $4(Cl^-)$, $5(NO_3^-)$ and $6(SO_4^{--})$. Curves 1a through 6a are to be understood the same way for the second elimination process.

The second regeneration of the ion exchange resin, which took place after the first elimination of the ions from the raw water and which is decisive for the experiment, was performed with a quantity of raw water of 4.31 l, and as in the previous regeneration, 20 g $CaCO_3$ and a $CO_2$ throughput of 200 to 300 l. The ion concentrations in the decanted effluent (regenerate) were as follows:
$cCl = 5.65$ mmol/l
$cNO_3 = 3.11$ mmol/l
$cSO_4 = 8.36$ mmol/l
Thus, a total of
12.48 mmol $Cl^-$
6.95 mmol $NO_3^-$ and
30.86 mmol $SO_4^{--}$
were removed.

The second elimination process was performed under the same conditions as the first elimination process and, as is shown in FIG. 5, exhibited practically the same results.

(b) Elimination of nitrate and sulfate ions with prior conversion of the exchange resin to the chloride form and subsequent regeneration wth $CaCO_3$ and $CO_2$.

415 ml of the same ion exchange resin as in part (a) of this Example were used. The ion exchange resin was charged to 95% of its capacity with chloride ions and to 5% of its capacity with sulfate ions. For the first regeneration, the charged ion exchange resin was treated with 4.3 liters of a raw water of the composition
$cCl = 1.55$ mmol/l
$cNO_3 = 1.66$ mmol/l
$cSO_4 = 1.12$ mmol/l
and with the same quantity of $CaCO_3$ and the same $CO_2$ throughput as described in part (a). The ion concentrations in the decanted effluent were:
$cCl = 27.25$ mmol/l
$cNO_3 = 0.37$ mmol/l
$cSO_4 = 0.14$ mmol/l The ion exchange resin pretreated in this way was used for an experiment which consisted of 28 hours of a first elimination of nitrate and sulfate, about 2 hours treatment of the exchange resin with a circulating $CaCl_2$ solution, 4 hours of second regeneration of the exchange resin and 6 hours of second elimination of nitrate and sulfate ions.

Figure 6:
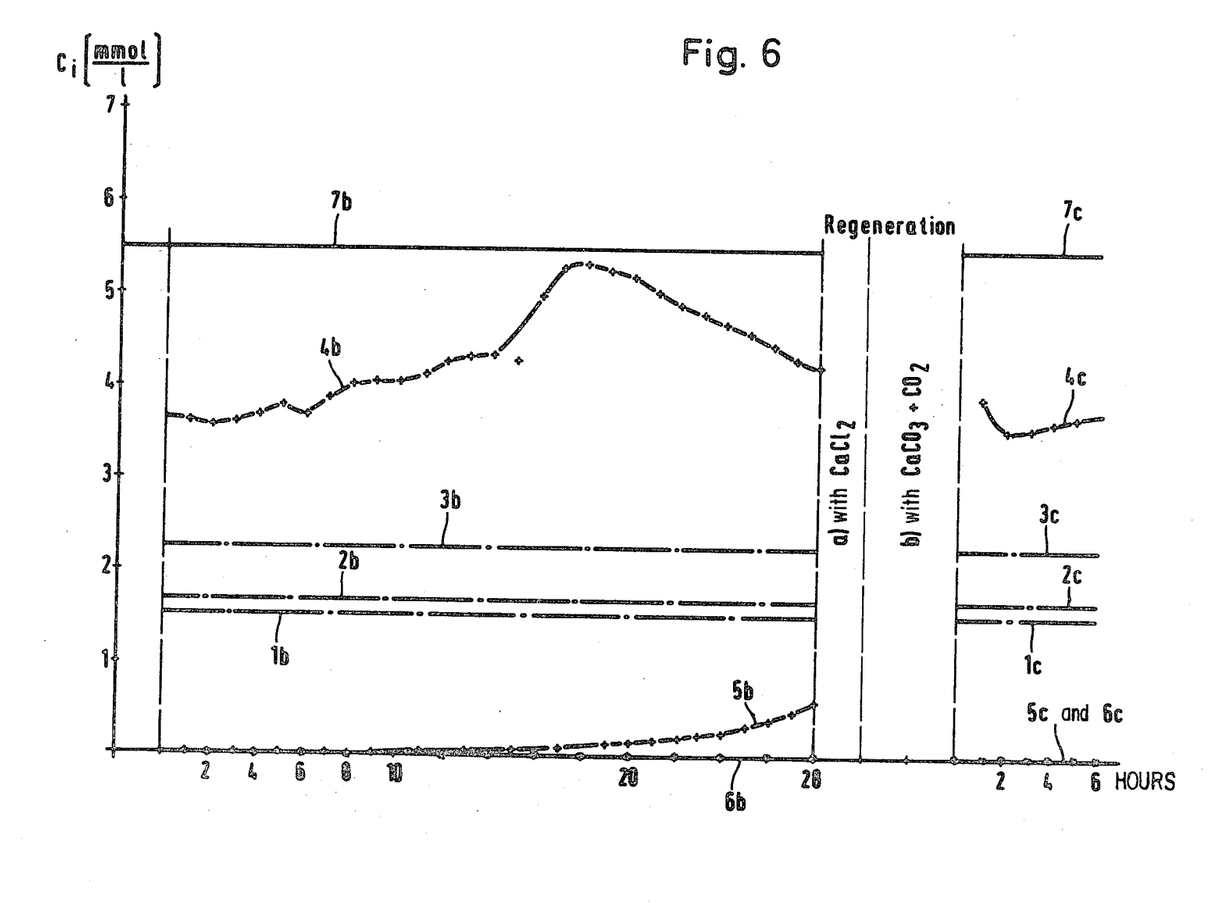
FIG. 6 shows the intake and discharge concentrations of chloride, nitrate and sulfate ions in two elimination experiments with an intermediate regeneration, wherein the resin is treated with a calcium chloride solution immediately prior to the regeneration.

FIG. 6 shows the concentration curves during the first elimination process and during the second elimination process which was terminated after 6 hours. The intake concentrations are shown by the curves 1b ($Cl^-$), 2b ($NO_3^-$), and 3b ($SO_4^{--}$) and 7b (sum of anion concentrations in the intake) for the first elimination process, and by the corresponding curves 1c, 2c, 3c and 7c for the second elimination process. The discharge concentrations of the various ions are shown in curves 4b to 6b for the first elimination process and curves 4c to 6c for the second elimination process. The discharge concentrations of chloride ions are shown in curves 4b and 4c, respectively, the discharge concentrations of the nitrate ions are shown in curves 5b and 5c and the discharge concentrations of sulfate ions are shown by curves 6b and 6c which during the entire duration of the experiment lie on the zero line.

Until there is a noticeable nitrate concentration in the discharge (after about 20 hours) in the first elimination process, the chloride concentration after passage of the resin is practically identical with the sum of the anion concentration (without $HCO_3^-$). The shape of the curve shows that during the first 14 hours one half to dered $CaCO_3$ and from the bottom with water and $CO_2$ or a $CO_2$-containing gas. Here again the gas is pumped into column 10 and then recirculated. The concentrated effluent is discharged at the top end 12 of column 10, and the regenerated exchange resin is discharged at the bottom end 13. Water and exchange resin streams must be used in such quantities that the period of contact is sufficient for the regeneration process.

The following examples are given by way of illustration to further explain the principles of the invention. These examples are merely illustrative and are not to be understood as limiting the scope and underlying principles of the invention in any way. All percentages referred to herein are by weight unless otherwise indicated.

EXAMPLE 1

A. Experiment for the removal of nitrate:

510 ml of a strong base anion exchange resin with quaternary amino groups (Type I) charged to 100% of capacity with nitrate ions was regenerated in eight stages. The quantity of water used per stage was, on the average, 650 ml, and the quantity of $CaCO_3$ used per stage, was, on the average, 1 g. The introduction of carbon dioxide was controlled so that a $CO_2$ pressure of about 0.1 MPa existed above the suspension. In the effluent solutions of the individual stages, the quantities of nitrate removed from the ion exchange resin were measured in the form of nitrate concentrations ($^cNO_3^-$) in mmol/l. The following values were obtained:

| Stage | $^cNO_3^-$ in mmol/l |
|---|---|
| 1 | 26.25 |
| 2 | 23.96 |
| 3 | 20.55 |
| 4 | 17.05 |
| 5 | 16.96 |
| 6 | 15.54 |
| 7 | 13.48 |
| 8 | 8.73 |

Thus, a total of 94.5 mmol, corresponding to 20% of the capacity of nitrate ions, were removed from the ion exchanger. Then the filter bed containing the ion exchanger was rinsed for seven minutes with one-half liter of water per minute. The total amount of water required (water for the regeneration plus water for rinsing) was 9 liters.

Then, in order to examine its reusability, the ion exchange resin was reused to remove nitrates from raw water. The nitrate concentration in the raw water was 2 mmol/l, which is equivalent to 124 mg/l. The process worked with a throughput of 1.8 l/h, and the filtering speed was 1 m/h. Although these were not optimum conditions, about 48% of the nitrate was absorbed from the raw water during a period up to 80 hours (the nitrate in the discharge was 1.05 mmol/l). After this period of operation, it was noted that the filter gradually broke through. The total time for the experiment was 120 hours. 144 l of raw water (equal to 282 bed volumes) were processed through the filter during the 80 hours. A comparison of the quantity of water required for the regeneration and the water throughput for the removal of nitrates from the raw water resulted in a ratio of fresh water to processed water of 1:16.

EXAMPLE 2

An experiment was conducted to show the efficiency of various types of anion exchange resins for the removal of chloride or nitrate ions, from simulated waste waters, in dependence on the concentration of those ions.

The ion exchange resin was initially completely charged with either chloride or nitrate ions, and then regenerated. The volume ratio of anion exchange resin to the water containing the above-mentioned ions was 1 ml resin to 100 ml water in each case. The partial pressure of $CO_2$ was 0.1 MPa, the amount of $CaCO_3$ being 5 g/l resin. The chloride and nitrate ion concentrations, respectively, were 10.5 to 2.5 mmol/l. The decrease in ion concentration in the water after sorption is shown in Table 1 below:

TABLE 1

| Anion Exchanger | Initial Concentration of Ions in water (mmol/l) | Decrease in Concentration in the water after the Sorption process |
|---|---|---|
| Weak base with tertiary amino groups | 10 ($Cl^-$) | 25% |
| | 5 ($Cl^-$) | 35% |
| | 2.5 ($Cl^-$) | 39% |
| | 10 ($NO_3^-$) | 52% |
| | 5 ($NO_3^-$) | 46% |
| Strong base with quaternary amino groups (Type I) | 10 ($Cl^-$) | 45.2% |
| | 5 ($Cl^-$) | 46.6% |
| | 2.5 ($Cl^-$) | 50.2% |
| | 10 ($NO_3^-$) | 49.6% |
| | 5 ($NO_3^-$) | 50.4% |
| | 2.5 ($NO_3^-$) | 56.9% |
| Strong base with quaternary amino groups (Type II) | 10 ($Cl^-$) | 42.6% |
| | 5 ($Cl^-$) | 45.1% |
| | 2.5 ($Cl^-$) | 49.5% |
| Strong base pyridine Type | 10 ($NO_3^-$) | 36.4% |
| | 5 ($NO_3^-$) | 49.2% |
| | 2.5 ($NO_3^-$) | 53.2% |

For two strong base anion exchange resins, the ratio of quantities of simulated raw water to ion exchange resin was varied and then the decreases in concentration values were listed for two different concentrations of ions to be removed.

The results are shown in Table 2 below:

TABLE 2

| Anion Exchange | Ratio of quantities of simulated raw water to anion exchange resin (liters of water per ml of resin) | Initial concentration of ions in water (mmol/l) | Decrease in concentration in the water after the sorption process |
|---|---|---|---|
| Strong base with quaternary amino groups (Type I) | 0.1 liter/ml | 10 ($Cl^-$) | 45% |
| | 0.2 liter/ml | 10 | 35% |
| | 0.3 liter/ml | 10 | 27% |
| | 0.4 liter/ml | 10 | 20.5% |
| | 0.1 liter/ml | 5 ($Cl^-$) | 46.6% |
| | 0.2 liter/ml | 5 | 38.8% |
| | 0.3 liter/ml | 5 | 32.4% |
| | 0.4 liter/ml | 5 | 29.8% |
| | 0.5 liter/ml | 5 | 26.7% |
| Strong base with quaternary amino groups (Type II) | 0.1 liter/ml | 10 ($NO_3^-$) | 49.6% |
| | 0.2 liter/ml | 10 | 31.9% |
| | 0.3 liter/ml | 10 | 25.9% |
| | 0.4 liter/ml | 10 | 20.6% |
| | 0.1 liter/ml | 5 ($NO_3^-$) | 50.4% |
| | 0.2 liter/ml | 5 | 42.0% |
| | 0.3 liter/ml | 5 | 37.3% | one third of the sulfate and nitrate ions are replaced by bicarbonate ions (see distance of curve 4b and curve 7b).

The discharge thus contains less neutral salt and, most importantly, no sulfate and almost no nitrate, i.e. the undesirable types of ions have been eliminated.

The ion exchange resin was subjected to a second regeneration after the first elimination. In the second regeneration, the exchange resin was first treated with 4.1 l calcium chloride solution having a chloride concentration of one mole/l. Thereafter, the nitrate and sulfate ion concentrations in the decanted calcium chloride effluent were:

$c_{NO_3} = 18.6$ mmol/l $c_{SO_4} = 14.2$ mmol/l (corresponds to the solubility of $CaSO_4$).

Thereafter, regeneration again took place with $CaCO_3$ and $CO_2$ in the quantities described above as well as with the raw water described above in a quantity of 4.85 l as described above. The ion concentrations in the decanted effluent were:

$c_{Cl} = 43.3$ mmol/l $c_{NO_3} = 1.37$ mmol/l $c_{SO_4} = 0.07$ mmol/l

For the second elimination of nitrate and sulfate ions, the same throughput (2.4 l per hour) of the same raw water was used. As shown by the concentration curves 1c to 7c of FIG. 6, the discharge was again free of sulfates and initially contained almost no nitrates.

It will be understood that the above description of the present invention is susceptible to various modifications, changes and adaptation, and the same are intended to be comprehended within the meaning and range of equivalents of the appended claims.

What is claimed is:

1. Process for regenerating to a bicarbonate form, a charged ion exchange resin which is present in aqueous suspension and used for the removal of strong acid ions from water, and which after regeneration is separated from an effluent formed during the regeneration and reused, the regeneration being conducted by contacting the charged resin with an aqueous treating medium which forms an aqueous suspension with the resin, comprising:

(a) providing in the aqueous suspension a quantity of calcium carbonate in excess of that which is necessary to maintain solid calcium carbonate in the resin suspension during the entire period of the regeneration, with the pH of the resin suspension during the regeneration being at about 5 to about 7; and (b) simultaneously introducing into the aqueous suspension carbon dioxide, with the partial pressure of the carbon dioxide above the resin suspension being maintained at between about $5 \times 10^{-3}$ MPa and about 1.0 MPa, during the period of the regeneration, wherein the concentration of bicarbonate ion in the resin suspension is kept constant during the entire period of the regeneration.

2. The process of claim 1 wherein the partial carbon dioxide pressure above the aqueous resin suspension is between about 0.01 MPa and 0.2 MPa.

3. The process of claim 1 wherein the calcium carbonate is added in powdered form to the aqueous resin suspension, and is separated from the regenerated anion exchange resin, after the regeneration, by rinsing.

4. The process of claim 3 wherein the separated calcium carbonate is reused.

5. The process of claim 1 wherein the calcium carbonate employed is of such a type that is produced by a weak acid cation exchange resin during a known regeneration process.

6. Process as defined in claim 1 wherein the regeneration process is repeated several times in a series on the same charge of ion exchange resin, with fresh raw water being used as the aqueous treating medium only for the last stage of the series, and the other stages of the series being treated with effluent solution from a previous regeneration series, with each successive regeneration stage in the series being performed with effluent having a lesser anion concentration than the effluent for the previous regeneration stage in the series.

7. Process as defined in claim 6 wherein the effluent with the lowest charge of anions is used for the penultimate stage, the effluent with the next higher anion charge is used for the stage before that, and the effluent with the highest anion charge is used for the first stage.

8. Process as defined in claim 1 wherein, prior to the contacting of the anion exchange resin with the calcium carbonate, the anion exchange resin converted to the chloride form by contacting it with a calcium chloride solution having a chloride concentration of about 0.5 to 1.0 moles/liter.

* * * * *